United States Patent
Spitzer

[11] Patent Number: 6,091,546
[45] Date of Patent: Jul. 18, 2000

[54] EYEGLASS INTERFACE SYSTEM

[75] Inventor: Mark B. Spitzer, Sharon, Mass.

[73] Assignee: The Microoptical Corporation, Boston, Mass.

[21] Appl. No.: 09/182,609

[22] Filed: Oct. 29, 1998

Related U.S. Application Data

[60] Provisional application No. 60/064,430, Oct. 30, 1997.

[51] Int. Cl.⁷ .................................................. G02B 27/10
[52] U.S. Cl. .......................... 359/618; 359/630; 351/123; 351/158; 351/50; 345/8
[58] Field of Search ..................... 359/618, 630, 359/409; 351/158, 123, 50; 345/6, 8

[56] References Cited

U.S. PATENT DOCUMENTS

| | | | |
|---|---|---|---|
| Re. 28,847 | 6/1976 | Vizenor | 350/302 |
| D. 195,365 | 6/1963 | Holt | D57/1 |
| 3,192,826 | 7/1965 | Papke . | |
| 3,216,308 | 11/1965 | Northcutt | 88/1 |
| 3,229,580 | 1/1966 | Mitchell | 88/86 |
| 3,524,710 | 8/1970 | Rickert | 356/251 |
| 3,610,825 | 10/1971 | Fritzel | 178/7.8 |
| 3,787,109 | 1/1974 | Vizenor | 350/302 |
| 3,885,095 | 5/1975 | Wolfson et al. | 178/7.88 |
| 3,915,548 | 10/1975 | Opittek et al. | 350/3.5 |
| 3,923,370 | 12/1975 | Mostrom | 350/55 |
| 3,936,605 | 2/1976 | Upton | 179/1 SP |
| 3,940,204 | 2/1976 | Withrington | 350/3.5 |
| 4,052,073 | 10/1977 | Miller | 273/148 R |
| 4,082,432 | 4/1978 | Kirschner | 350/174 |
| 4,195,915 | 4/1980 | Lichty et al. | 350/345 |
| 4,218,111 | 8/1980 | Wirthington | 350/3.72 |
| 4,447,128 | 5/1984 | Ferrer | 350/174 |
| 4,550,984 | 11/1985 | Reymond | 350/404 |
| 4,664,475 | 5/1987 | Ferrer | 350/174 |
| 4,665,385 | 5/1987 | Henderson | 340/539 |
| 4,722,601 | 2/1988 | McFarlane | 356/152 |
| 4,751,691 | 6/1988 | Perera | 368/10 |
| 4,753,514 | 6/1988 | Kubik | 350/174 |
| 4,799,765 | 1/1989 | Ferrer | 350/174 |
| 4,806,001 | 2/1989 | Okabe et al. | 350/432 |
| 4,806,011 | 2/1989 | Bettinger | 351/158 |
| 4,818,048 | 4/1989 | Moss | 350/3.7 |
| 4,826,287 | 5/1989 | Cook et al. | 350/174 |
| 4,852,988 | 8/1989 | Velez et al. | 351/210 |
| 4,853,306 | 8/1989 | Wreede et al. | 430/1 |
| 4,867,551 | 9/1989 | Perera | 351/158 |
| 4,869,575 | 9/1989 | Kubik | 350/174 |

(List continued on next page.)

FOREIGN PATENT DOCUMENTS

| | | | |
|---|---|---|---|
| 22 05 325 C2 | 4/1973 | Germany | 356/251 |
| 301672 | 12/1928 | United Kingdom | 350/286 |

OTHER PUBLICATIONS

Ferrin, Frank J., "An update on optical systems for military head mounted displays", presented at SPIE's "AeroSense", Apr. 5–9, 1999, 8 pages.

(List continued on next page.)

*Primary Examiner*—Loha Ben
*Attorney, Agent, or Firm*—Weingarten, Schurgin, Gagnebin & Hayes LLP

[57] ABSTRACT

An eyeglass interface system is provided which integrates interface systems within eyewear. The system includes a display assembly and one or more audio and/or video assemblies mounted to an eyeglass frame. The display assembly is mounted to one temple and provides an image which can be viewed by the user. The audio or video assembly is mounted to the other temple and is in communication with the display assembly. The audio or video assembly may comprise a camera assembly and/or an audio input or output assembly, such as a microphone and/or speakers. The camera assembly is placed on the temple to record the visual field observed by the user. A head-tracking assembly may be provided to track the position of the user's head. A number of applications can be provided with the present system, such as a telephone system, pager system, or surveillance system. The present eyeglass interface system is compact, offers the user hands-free operation, and provides an attractive appearance due to concealment of the assemblies within the eyeglass frame and lenses.

57 Claims, 10 Drawing Sheets

U.S. PATENT DOCUMENTS

| | | | |
|---|---|---|---|
| 4,968,117 | 11/1990 | Chern et al. | 350/162.24 |
| 4,973,132 | 11/1990 | McDonald et al. | 350/174 |
| 4,973,139 | 11/1990 | Weinhrauch et al. | 350/345 |
| 5,003,300 | 3/1991 | Wells | 340/705 |
| 5,013,134 | 5/1991 | Smith | 350/174 |
| 5,028,119 | 7/1991 | Hegg et al. | 350/174 |
| 5,044,709 | 9/1991 | Smith et al. | 359/13 |
| 5,050,962 | 9/1991 | Monnier et al. | 359/13 |
| 5,053,755 | 10/1991 | Smith et al. | 340/705 |
| 5,129,716 | 7/1992 | Holakovszky et al. | 351/50 |
| 5,138,470 | 8/1992 | Moss et al. | 359/13 |
| 5,162,828 | 11/1992 | Furness et al. | 353/122 |
| 5,212,471 | 5/1993 | McDonald | 340/705 |
| 5,214,425 | 5/1993 | Wreede | 340/980 |
| 5,231,379 | 7/1993 | Wood et al. | 340/705 |
| 5,281,957 | 1/1994 | Schoolman | 345/8 |
| 5,281,960 | 1/1994 | Dwyer, III | 345/31 |
| 5,309,169 | 5/1994 | Lippert | 345/8 |
| 5,320,538 | 6/1994 | Baum | 434/307 |
| 5,325,386 | 6/1994 | Jewell et al. | 372/50 |
| 5,334,991 | 8/1994 | Wells et al. | 345/8 |
| 5,348,477 | 9/1994 | Welch et al. | 434/43 |
| 5,359,669 | 10/1994 | Shanley et al. | 382/6 |
| 5,367,345 | 11/1994 | daSilva | 351/123 |
| 5,369,415 | 11/1994 | Richard et al. | 345/6 |
| 5,381,267 | 1/1995 | Woody | 359/632 |
| 5,384,654 | 1/1995 | Iba | 359/364 |
| 5,392,158 | 2/1995 | Tosaki | 359/633 |
| 5,416,876 | 5/1995 | Ansley et al. | 385/116 |
| 5,455,591 | 10/1995 | Hui | 342/185 |
| 5,459,612 | 10/1995 | Ingelton | 359/630 |
| 5,469,185 | 11/1995 | Lebby et al. | 345/8 |
| 5,491,510 | 2/1996 | Gove | 348/77 |
| 5,506,728 | 4/1996 | Edwards et al. | 359/629 |
| 5,519,410 | 5/1996 | Smalanskas et al. | 345/7 |
| 5,537,253 | 7/1996 | Cox et al. | 359/630 |
| 5,539,578 | 7/1996 | Togino et al. | 359/630 |
| 5,579,148 | 11/1996 | Nishikawa et al. | 359/214 |
| 5,583,590 | 12/1996 | Clupper | 351/200 |
| 5,585,871 | 12/1996 | Linden | 351/158 |
| 5,589,846 | 12/1996 | Kobayashi | 345/8 |
| 5,596,451 | 1/1997 | Handschy et al. | 359/633 |
| 5,606,743 | 2/1997 | Vogt et al. | 455/347 |
| 5,610,765 | 3/1997 | Colucci | 359/633 |
| 5,629,790 | 5/1997 | Neukermans et al. | 359/198 |
| 5,648,789 | 7/1997 | Beadles et al. | 345/8 |
| 5,654,827 | 8/1997 | Reichert | 359/631 |
| 5,654,828 | 8/1997 | Togino et al. | 359/633 |
| 5,671,037 | 9/1997 | Ogasawara et al. | 351/158 |
| 5,673,139 | 9/1997 | Johnson | 359/291 |
| 5,682,173 | 10/1997 | Holakovszky et al. | 345/8 |
| 5,712,649 | 1/1998 | Tosaki | 345/8 |
| 5,717,479 | 2/1998 | Rickards | 351/158 |
| 5,719,588 | 2/1998 | Johnson | 345/8 |
| 5,744,788 | 4/1998 | Metlitsky et al. | 235/454 |
| 5,751,493 | 5/1998 | Hur | 359/630 |
| 5,886,822 | 3/1999 | Spitzer | 359/630 |

OTHER PUBLICATIONS

Rotier, Donald J., "Optical Approaches to the Helmet Mounted Display", SPIE vol. 1116 Helmet–Mounted Displays (1989), pp. 14–18.

"The Wearable PC, Wired for wear: IBM researchers demonstrate a wearable ThinkPad Prototype", www.ibm.com/News/Is/1998/09/jp–3.phtml.

"Technical Prototype, See the specifications for IBM's new wearable PC Prototype", www.ibm.com/News/Is/1998/09/jp–4.phtm.

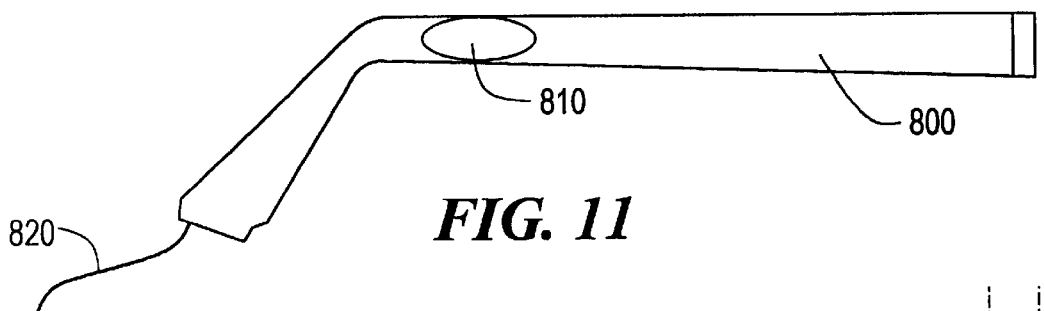
FIG. 11
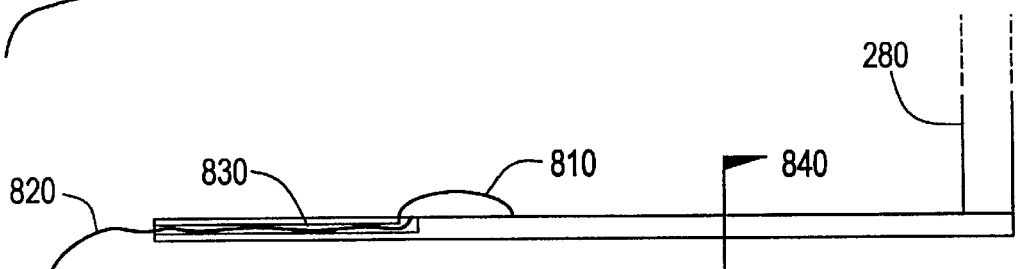
FIG. 12
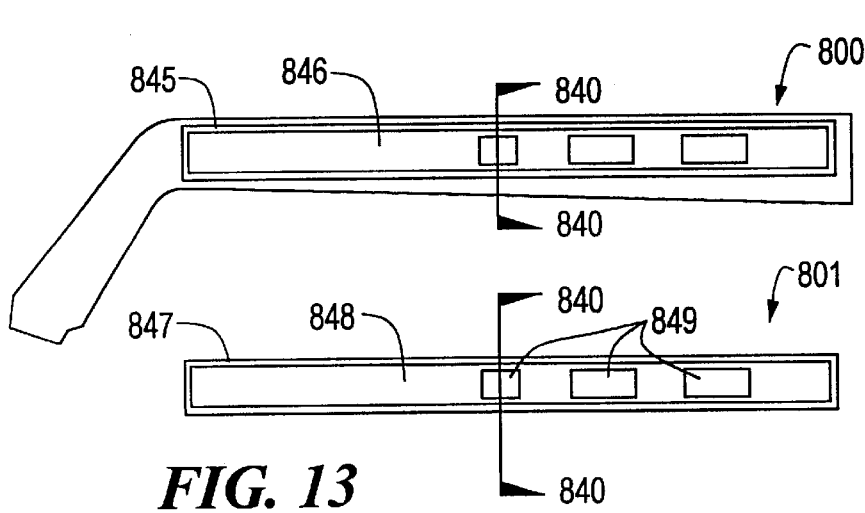 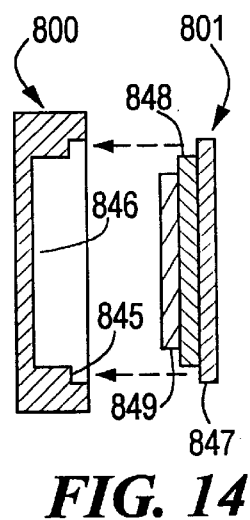
FIG. 13  FIG. 14
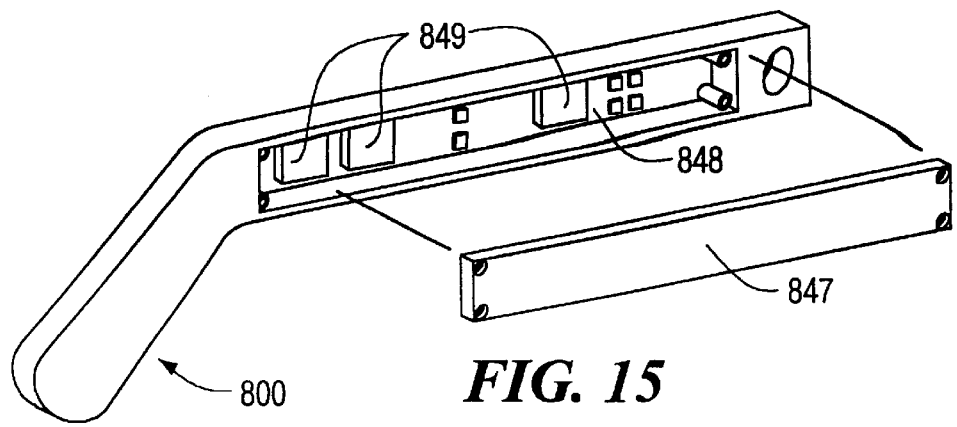
FIG. 15

EYEGLASS INTERFACE SYSTEM

CROSS REFERENCE TO RELATED APPLICATIONS

This application claims the benefit under 35 U.S.C. § 119(e) of U.S. Provisional Application No. 60/064,430, filed Oct. 30, 1997, the disclosure of which is incorporated by reference herein.

STATEMENT REGARDING FEDERALLY SPONSORED RESEARCH OR DEVELOPMENT

N/A

BACKGROUND OF THE INVENTION

Information storage and processing, electronic recording of sound and images, electronic communications, and electronic entertainment systems have become widespread, and portable applications of these technologies are growing rapidly. The integration of a camera with a head-mounted display was disclosed by Hawthorne in U.S. Pat. No. 4,672,436 for use in camcorder systems. In this case, only the display is placed on the head and the camera is held in the operator's hand. U.S. Pat. No. 5,491,510 discloses a system for superimposing an image of an object. The camera described in this patent is separate from the user, requiring significant processing to correct for the large parallax angle between the camera and user's view.

In U.S. Pat. No. 5,129,716, Holakovsky discloses a head mounted stereoscopic vision system for the purpose of providing television audio and video information to the user. U.S. Pat. No. 5,717,479 discloses safety glasses comprising audio speakers, a microphone, and a heads-up display. The speakers are placed in protective ear inserts in order to attenuate external noise. U.S. Pat. No. 5,606,743 to Vogt discloses a radio receiver and speakers mounted in an eyeglass frame, but includes no provision for audio input or for video input or output. U.S. Pat. No. 5,367,345 to daSilva discloses an audio system enclosed in an eyeglass retainer that is substantially separate from any eyeglass system to which it may be attached. Hearing aid audio components have been mounted in eyewear.

Ritchey, in U.S. Pat. Nos. 5,130,794 and 5,495,576, discloses a panoramic display and its use in an audio-visual virtual reality/telepresence system. This system is designed specifically to allow immersive interaction with a remote or virtual object. An electronic camera in the nose frame of eyewear has been offered for sale by one organization that provides covert surveillance devices.

BRIEF SUMMARY OF THE INVENTION

Full portability for many of these interface systems requires reduction to the portable scale of the user interface. For most applications, it is desirable to have an audio/video interface which is compact and allows hands-free or nearly hands-free operation. In addition, it is desirable that such an interface be unobtrusive and not detract from the appearance of the user. The eyeglass interface system of present invention addresses the need for such an interface, by integrating the complete audio/video interface within eyewear.

The eyeglass interface system uses an eyeglass optical system or display assembly such as that in accordance with U.S. patent application Ser. No. 08/844,098, filed on Apr. 18, 1997, now U.S. Pat. No. 5,886,822, the disclosure of which is incorporated by reference herein. More particularly, the eyeglass interface system of the present invention comprises an eyeglass frame having first and second lens holders and first and second temples configured to be supported on a user's head. The display assembly used in the eyeglass interface system comprises an image source supported by the first temple, an optical pathway disposed internally within the first lens to receive light from the image source, and an insert in the first lens to redirect light on the optical pathway to the user's eye, as described more particularly in U.S. patent application Ser. No. 08/844,098. An audio and/or video assembly is mounted to the second temple, preferably in communication with the display assembly. The audio and/or video assembly is operative to receive or transmit audio and/or video signals. Interface circuitry is provided in communication with the display assembly and the audio and/or video assembly.

In a typical configuration according to the present invention, the display assembly is mounted within one half of the eyeglasses. The audio and/or video assembly comprises a camera assembly mounted within the other half. The system may also include audio transducers (microphone and/or speakers) which provide audio data and/or which collect sound for recording, digital signal processing and analysis. In this way, the microphone may also provide voice activated commands to the system. Additionally, the eyeglass system may include batteries and an RF or infrared communication system to eliminate the need for a cable to the glasses. Various types of systems may be formed using one or more of the subsystems. In its most complete form, the present eyeglass interface system includes the following subsystems or assemblies: an audio input assembly for collecting speech input from the user, a display assembly, an audio output assembly a camera assembly, and a head-tracking assembly to provide a computer with the position of the user's head. Thus, the eyeglass interface system includes audio, video, tracking and power modules.

The eyeglass interface system of the present invention provides computer input and output in highly compact forms, preferably entirely within eyeglasses, which look to the casual observer like ordinary eyewear. In some embodiments of the invention, the subsystems or assemblies are entirely concealed within the eyeglass frame and lenses. The invention comprises not only the integration of the hardware subsystems within an eyeglass frame, but also the integration of the subsystems with hardware and software intended for specific functions.

The present invention is an improvement over devices in the prior art owing to the complete integration of the camera assembly within the eyeglass frame and lens system of the eyeglasses. The mechanical aspects of the camera, including focusing mechanisms, are integrated within the eyeglass temple, as are the electronics in the form of a multi-chip module integrated in the temple. Additionally, lenses and optical surfaces of the camera assembly are integrated in the temple and even in the eyeglass lens itself. In this way, the camera assembly may attain its most compact form, may be made light, in weight, and may attain a greater degree of concealment and functionality than prior art devices. In addition, the present invention places the field of view of the camera in proximity to or convergent with the operator's field of view, so that the camera records the visual field observed by the user. The present invention allows the camera to have the same line of sight as the user's eye, without parallax error.

The present invention also includes the use of the camera assembly to control a computer. While in prior art camera systems, the camera merely collects data for the computer, in the present invention, the camera assembly also collects input commands. These commands may be in the of written symbols, hand signals, bar codes, or other forms that cause the computer to execute instructions.

The integration of the camera and display within eyewear according to the present invention provides eyewear that, is more compact and therefore easier to wear than prior art devices, and is more aesthetically appealing, because it looks like eyeglasses. The present invention uses optics embedded in the eyeglass lens rather than suspending them in a mount, making the system more durable. The present invention incorporates audio and video inputs as well as outputs. The audio assembly may be integrated into the eyeglass frame. Details of the visual display are not used in conjunction with normal hearing, and therefore one embodiment of the present system integrating an audio assembly seeks to avoid attenuating external sounds. The current system allows the user to interact with computer generated or other electronically relayed information without requiring the occlusion of the actual surroundings.

BRIEF DESCRIPTION OF THE SEVERAL VIEWS OF THE DRAWING

The invention will be more fully understood from the following detailed description taken in conjunction with the accompanying drawings in which:

FIG. 11 is a side view of an eyeglass temple incorporating an audio system;

FIG. 12 is a partial top plan view of the eyeglass system of FIG. 11;

FIG. 13 is an exploded view of a temple of an eyeglass interface system incorporating integrated circuits in a multichip module;

FIG. 14 is a cross-sectional view taken along line 840—840 in FIG. 13;

FIG. 15 is an exploded view of a further embodiment of a temple of an eyeglass interface system incorporating integrated circuits and flexible interconnect circuitry;

DETAILED DESCRIPTION OF THE INVENTION

Figure 1:
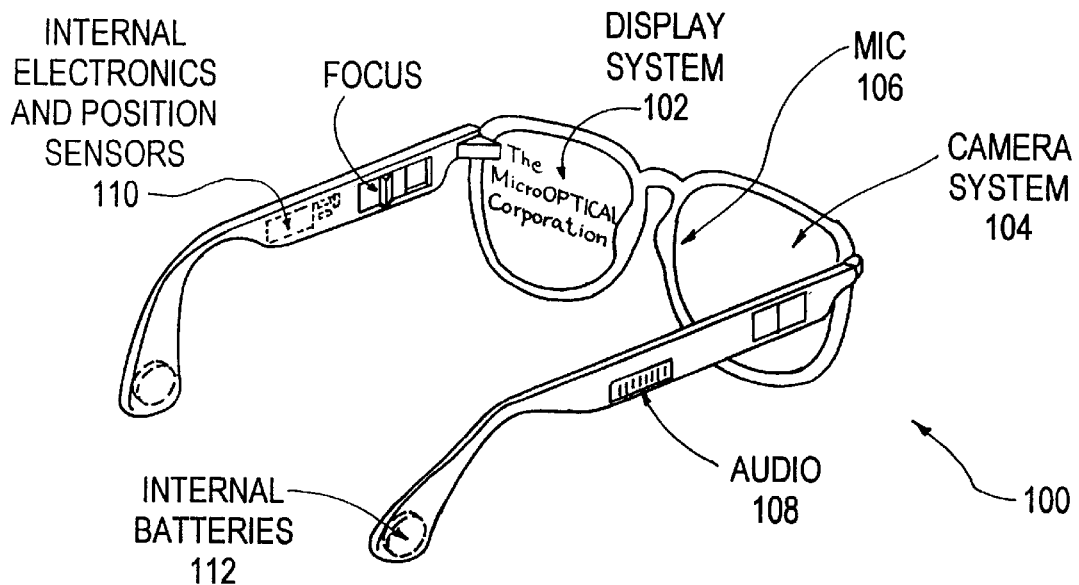
FIG. 1 is an isometric view of an eyeglass interface system according to the present invention.

FIG. 1 illustrates an eyeglass interface system 100 according to the present invention. Within one half of the eyeglass system is mounted a display assembly 102, and within the other half is mounted a camera assembly 104. The display assembly, as well as some aspects of a camera assembly, are described in U.S. patent application Ser. No. 08/844,098. Additional subsystems or assemblies include an audio output subsystem 108 an audio input subsystem 106 such as a microphone, an interconnection subsystem 110, and a power subsystem 112, such as internal batteries. Any number or all of these subsystems may be integrated to form an eyeglass interface system according to the present invention.

The integration of a camera assembly within eyewear is important for a number of applications, including image acquisition, data input by character recognition, bar code scanning, face recognition, and the like. The key factors which must be addressed in order to integrate a camera within eyewear are (i) portability, and (ii) making the camera adjustable so that it is aimed precisely where the user is looking with his or her eyes. This second factor is key for data input by character recognition. For example, if one is looking at a notepad and writing characters, the camera can be positioned within the eyewear so that the notepad is within the field of view of the camera. The characters written by the user can then be photographed by the camera and fed to a character recognition processor. Such a system can replace the keyboard as the data input device for portable applications. Currently, such functions are provided by touch sensitive screens, such as on the Palm Pilot and other pen-based data entry devices. A camera has the distinct advantage that it can work with ordinary pencil and paper. A scanner may also be built from a camera mounted within eyewear. Text that the user reads can be automatically fed to the computer, recognized, and stored.

Figure 2:
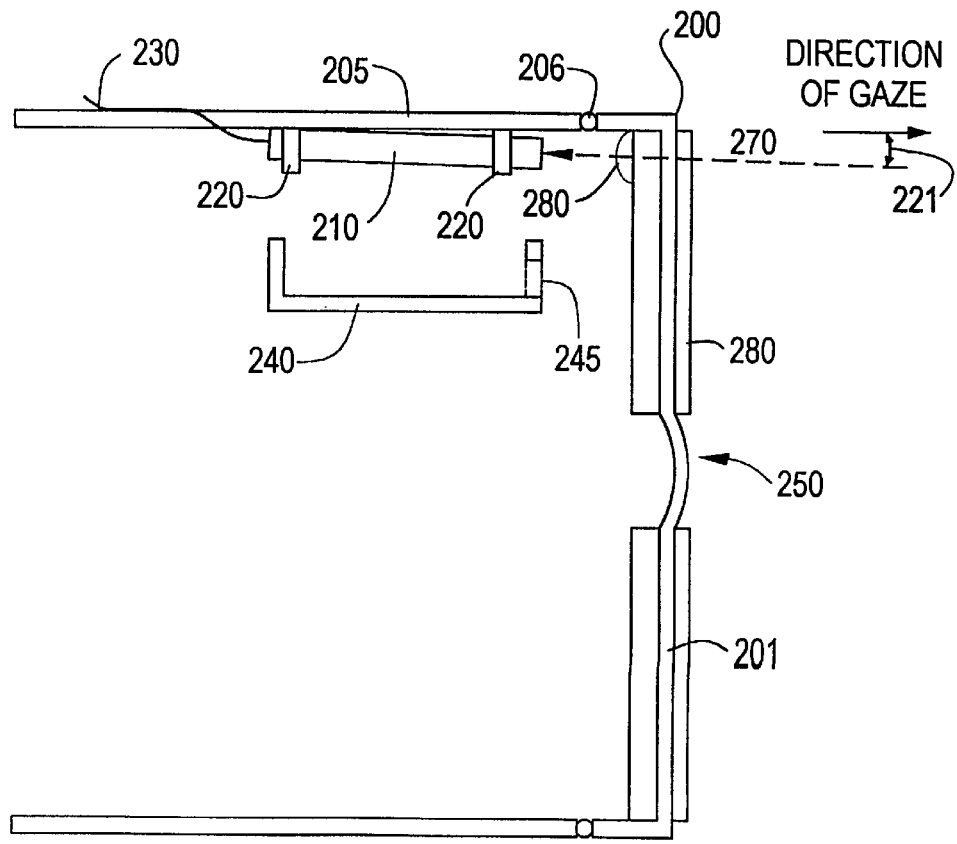
FIG. 2 is a top plan view of an eyeglass interface system incorporating a camera system.

FIG. 2 illustrates a design based on concealment of the camera 210 within the temple 205 of eyeglasses 250. The camera may comprise, for example, ELMO Model QN42H, which includes optional focusing lenses within the camera. The camera is mounted within a plurality of supports 220 and adjusted in angle 221 so that the field viewed by the camera overlaps the field viewed by the user. In FIG. 2, the viewing direction to the center of the field is indicated by ray 270. For a wide field of view camera or for uses at large distances, angle 221 may be zero. Shroud 240 with aperture 245 may be attached to the temple to conceal the camera. A lens 260 may be used to change the focal length of the camera's lens system. In such a case, the focus of the camera may be adjusted by frictionally sliding the camera 210 within the mounts 220 to adjust the distance between the camera 210 and the lens 260. An adjustment handle for this purpose may extend through the shroud 240 or the temple 205. A cable 230 may supply the signal generates by the camera to external electronics, or may connect to circuitry within the eyeglass temple.

The camera's field of view is obtained through the lens 280 held within frame front 200. This facilitates concealment of the camera. Further concealment may be obtained by tinting the lens, or by using polarization coatings, or by other means known in the art. If concealment is not desired, the camera may be mounted on the outside of the temple. It should also, be recognized that the camera may be mounted on either the left side (as shown in FIG. 2), or the right side. Alternatively, cameras may be mounted on both sides of the eyeglasses.

Figure 3:
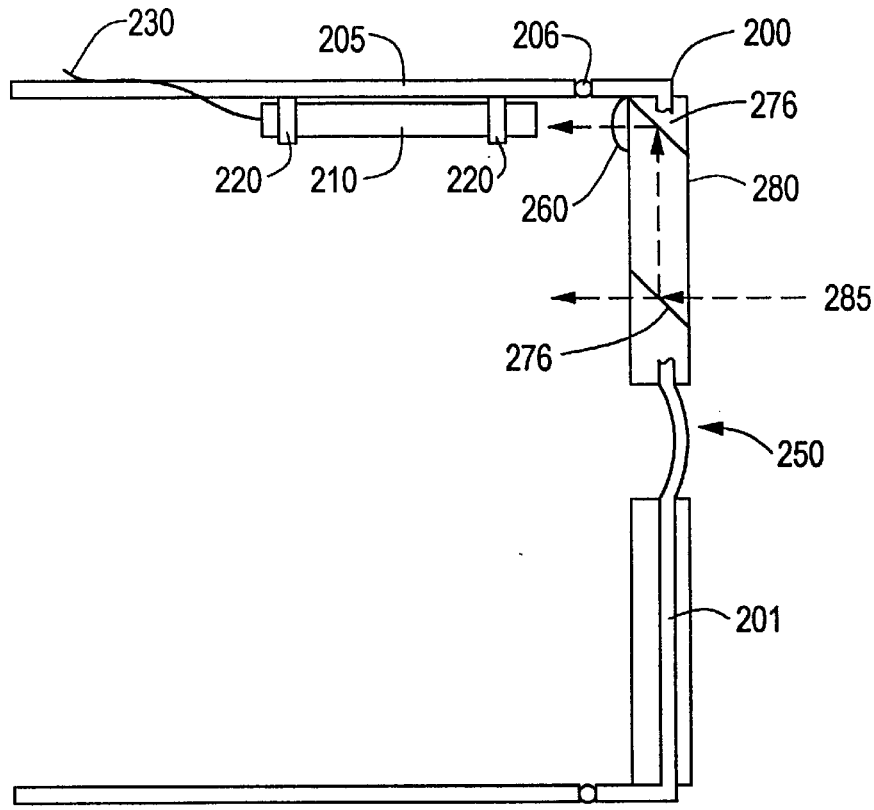
FIG. 3 is a top plan view of a further embodiment incorporating a camera system.
Figure 4:
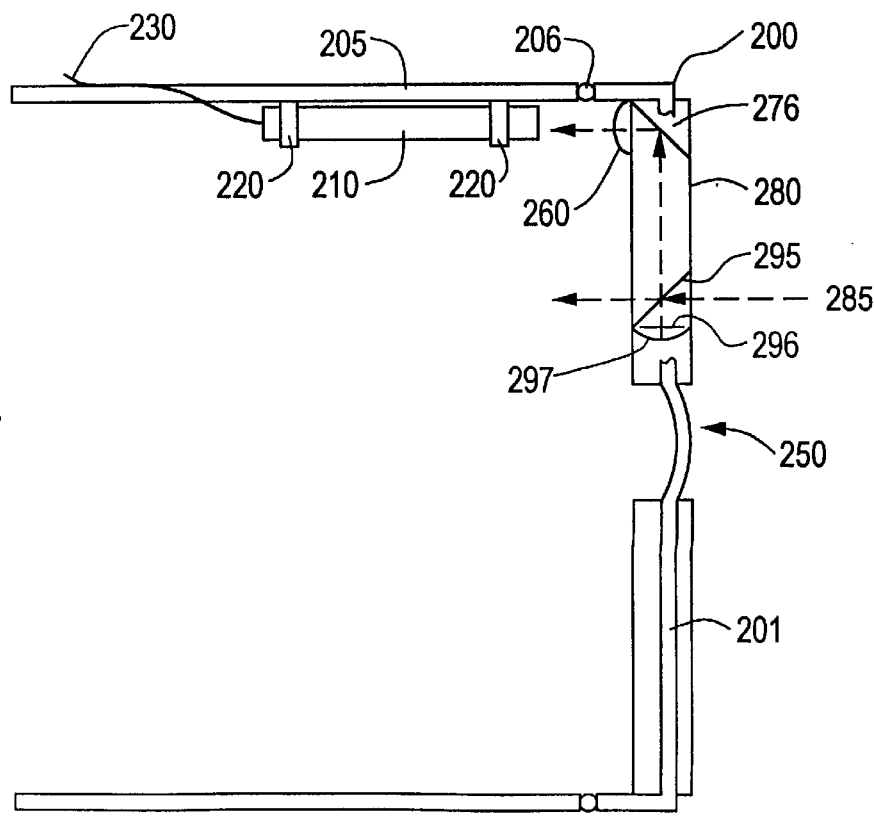
FIG. 4 is a top plan view of a still further embodiment incorporating a camera system.

An eyeglass system in which the camera is more nearly aligned to the user's direction of gaze is shown in FIG. 3. Rays represented by ray 285 which propagate to the user's eye are split at beam splitter coating 275, embedded within the lens 280, one half propagating to the eye and one half propagating to the camera by reflection at mirror coating 276. Optical power can be added near the user's eye without interference with the user's vision as shown in FIG. 4, by using a polarization beam splitting coating 295. Rays 285 are partially reflected or transmitted by coating 295 and for the typical case of unpolarized incident light, split with 50% propagating in each direction. One half of the light therefore propagates to the eye while the other half is reflected toward curved mirror 297. The rays first pass through quarter wave plate 296 and undergo a rotation of polarization, then propagate to mirror 297 and are focused and reflected back through quarter wave plate 296. Upon the second pass through plate 296 the waves have been rotated sufficiently to pass efficiently through the beam splitter coating to mirror 276 and from there through optional lens 260 and then to the camera.

Figure 5:
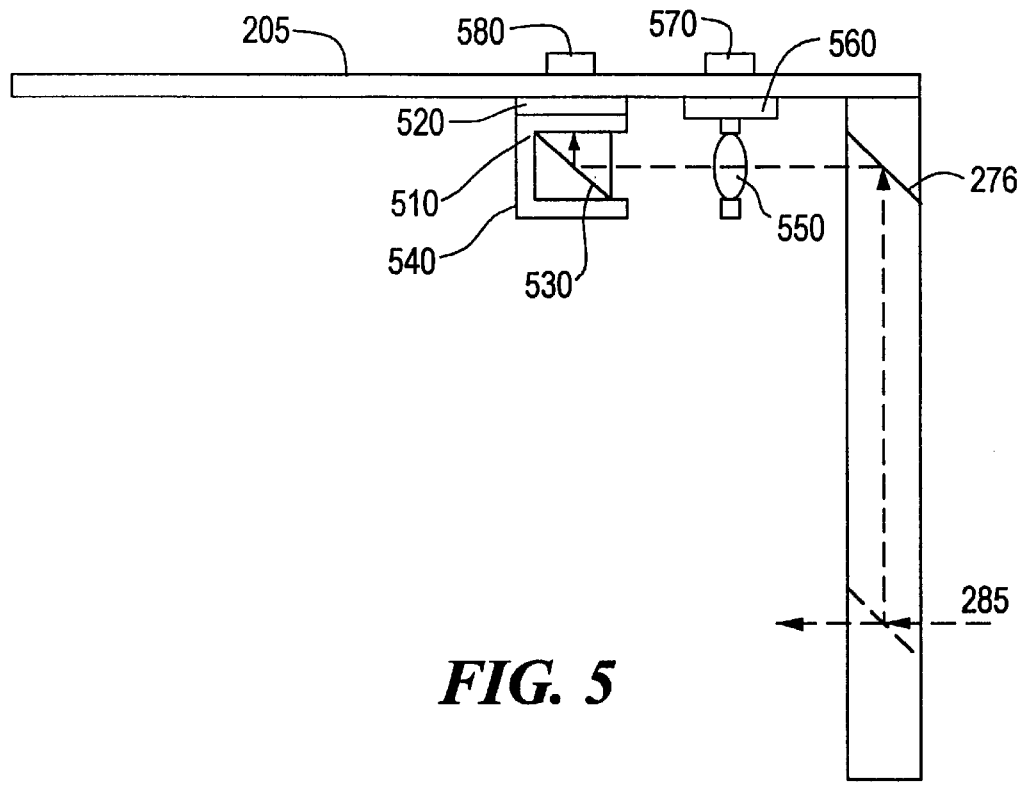
FIG. 5 is a top plan view of a still further embodiment incorporating a camera system.

A camera system may be integrated within the eyeglass temple in a further manner, as shown in FIG. 5. A charge coupled device (CCD) or complementary metal oxide semiconductor (CMOS) image sensor 510 is mounted to a sliding base 520 in contact, or partially within, or even fully within, eyeglass temple 205. The sliding base is in contact with handle 580 is through a slot in the temple (not shown) so that the user may slide 580 a short distance (between about 3 to 10 mm) for the purposes of focusing. The sliding base 520 is machined with keys or tracks in temple 205 to maintain alignment in a manner known in the art. A mirror 530 is positioned to receive light represented by rays 285 from the lens system, and is housed within shroud 540. A focusing lens 550 is mounted on a sliding base 560 which is in contact with handle 570 through temple 205 in the same manner as for base 520 and handle 580. The lens may be moved closer to or more distant from the imaging element 510 to adjust the focus. Preferably, only one base (either 520 or 560) needs to be moveable for adjustment purposes, and either may be chosen, although both could be adjustable if desired. Additional optical elements may be added to the camera system, any one or all of which may be positioned on a sliding base for adjustment. In this way, both focus and zoom adjustment may be accommodated. Alternatively, lens 550 may be mounted directly to or formed integrally with the main eyeglass lens 280, as shown in FIG. 3.

Figure 6:
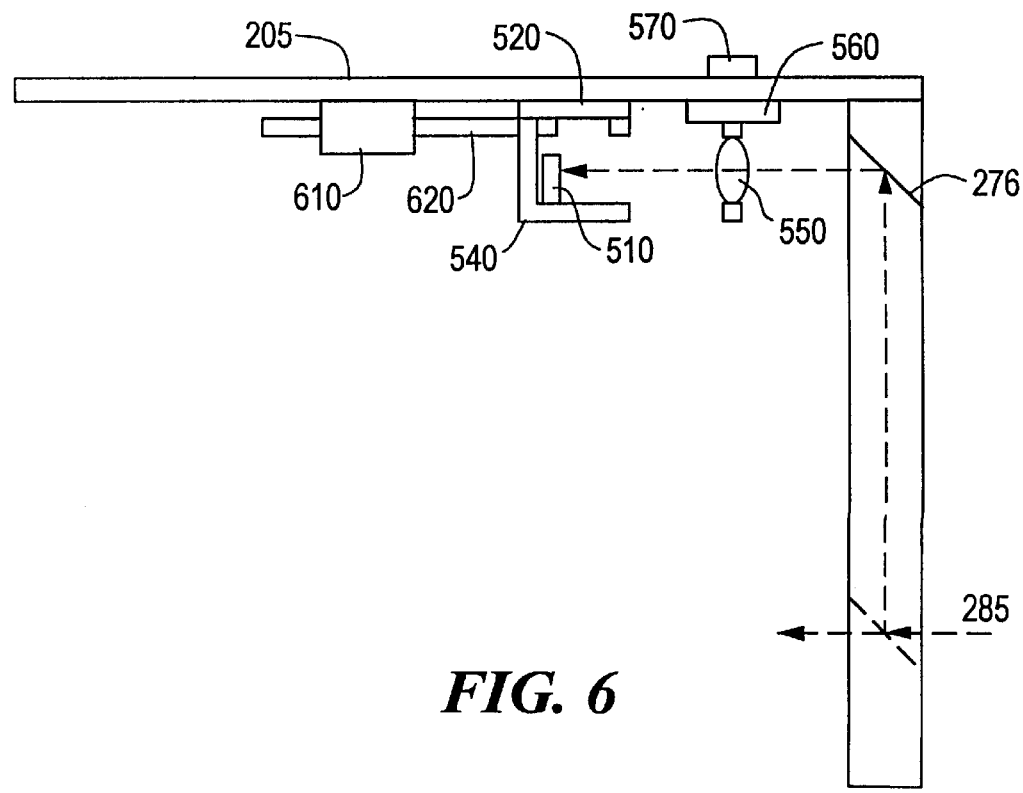
FIG. 6 is a top plan view of a still further embodiment incorporating a camera system.

Another embodiment which includes an auto focus mechanism is shown in FIG. 6. Imager 510 is mounted against shroud 540 upon the sliding base 520. A miniature stepper motor 610 is fixed to the temple 205 and is in contact with shroud 540 through lead screw 620. The stepper motor is in communication with remote electronics which can command the motor to run the lead screw in either direction in precise angular increments. Rotation or the lead screw in this way causes the shroud and sliding base to move toward or away from the motor, affecting the focus. The motor may be controlled through software which analyzes the image and issues focus commands to the motor, or which is in communication with a distance sensor to derive a focus signal. Such control systems are well known in the camcorder industry.

Figure 7:
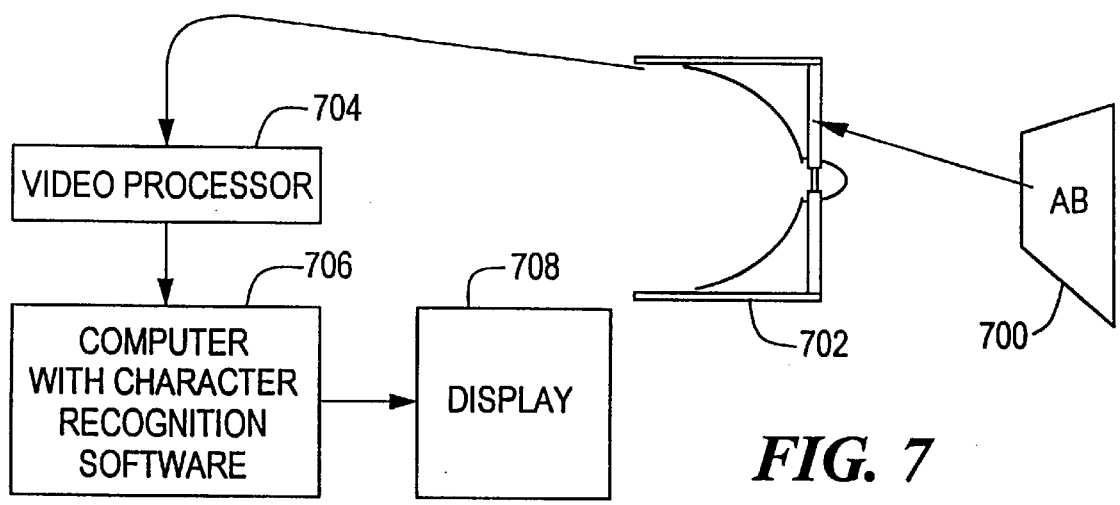
FIG. 7 is a schematic view of an eyeglass interface system operable with optical character recognition.

FIG. 7 illustrates a data input system based on optical character recognition. A user wearing the eyeglasses with camera, as described above, views a written object 700. The camera provides the raw video data to a video processor 704 (also known as a frame grabber) which stores in the memory of a computer 706 an image of the scene taken by the camera. The image is processed by the character recognition code in the computer 706 to determine the nature of the information and may be output to a display 708. In the same manner as text input is derived from a keyboard, the characters are stored in a buffer until the code detects a control character (the equivalent of a carriage return). The instruction is then executed. In a similar manner, the device may operate as a scanner. Images are stored in memory and a code is executed to construct a large image from the sequential frames. Another application involves the collection of video imagery. The video is collected by the camera and provided to the video processor which compresses the video stream and stores it within memory.

Figure 8:
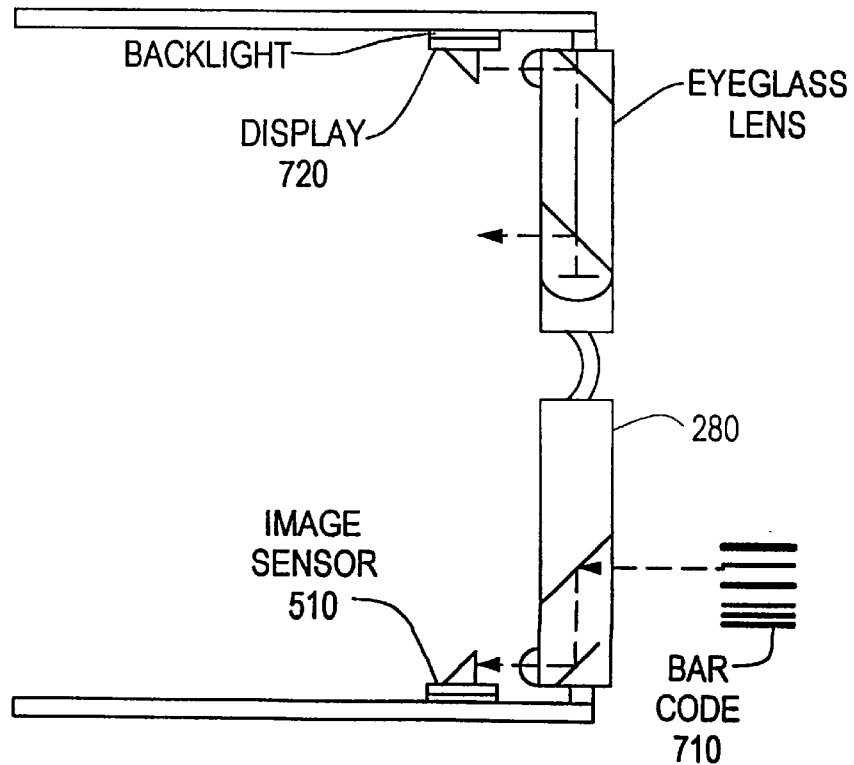
FIG. 8 is a top plan view of an embodiment incorporating a bar code reading system.
Figure 9:
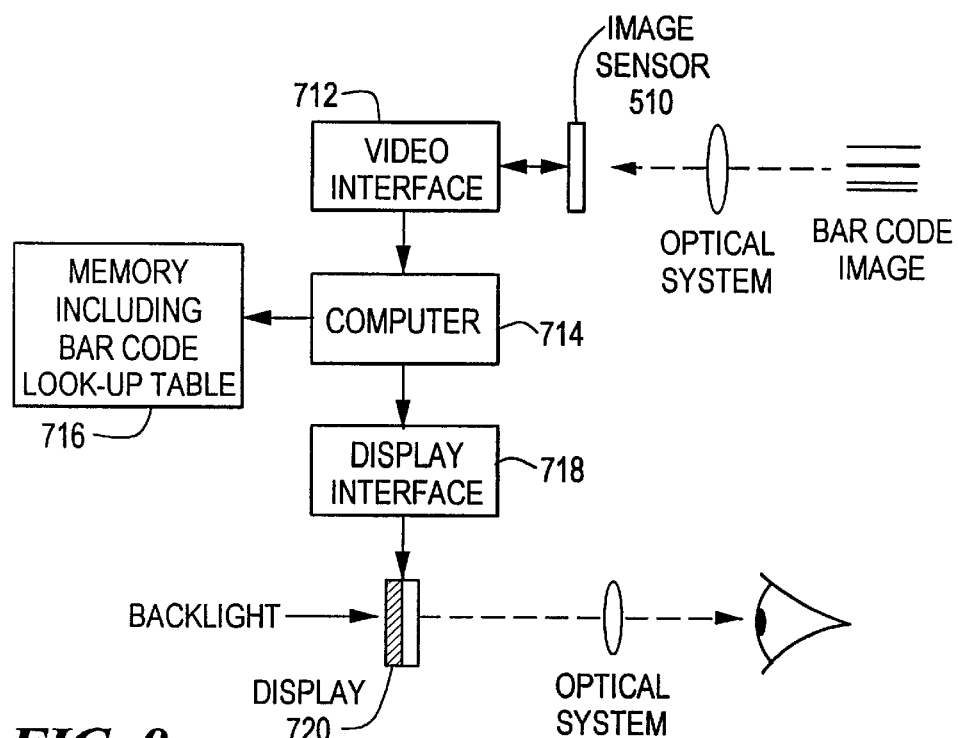
FIG. 9 is a schematic view of an eyeglass interface system operable with bar code recognition.

A bar code reading system may be built using the integrated system. It comprises eyeglass optics, display and camera as shown in FIG. 8. The image of the bar code is centered in the eyepiece of the right lens 280 so that the bar code stripes 710 are relayed to the image sensor 510. The camera system may be provided with autofocus as previously described. As shown in FIG. 9, the image from the sensor is provided electronically via video interface 712 to a computer 714 that employs character or pattern recognition to decode the stripes. The computer can be programmed with look-up tables 716 for universal price codes or any other bar codes, so that the output of the computer is then the decoded information in alpha-numeric characters, symbols or graphics. These characters are relayed electronically from the computer 714 via a display interface 718 to the display 720 mounted within the eyeglasses, so that the user sees the decoded information in the display.

Another application of a similar nature involves face recognition, wherein the bar code shown in FIGS. 8 and 9 are replaced by a face and the software is replaced by face recognition software. In this embodiment, the user looks at the face of another person and the camera records the image of that person's face. The software within the computer extracts the essential information and makes a comparison to a database. If the characteristics are matched in the database, the user is supplied with information about the person through the eyeglasses. A similar application comprises hand position recognition in which the position of the hands or a hand-held stylus is analyzed to create input or command signals to the computer.

In all of the above applications, it is necessary for the camera to record the view that the user has. The advantage of a camera mounted in eyewear is obtained, because the camera is aimed at the user's subject by virtue of its alignment within the eyeglasses.

Figure 10:
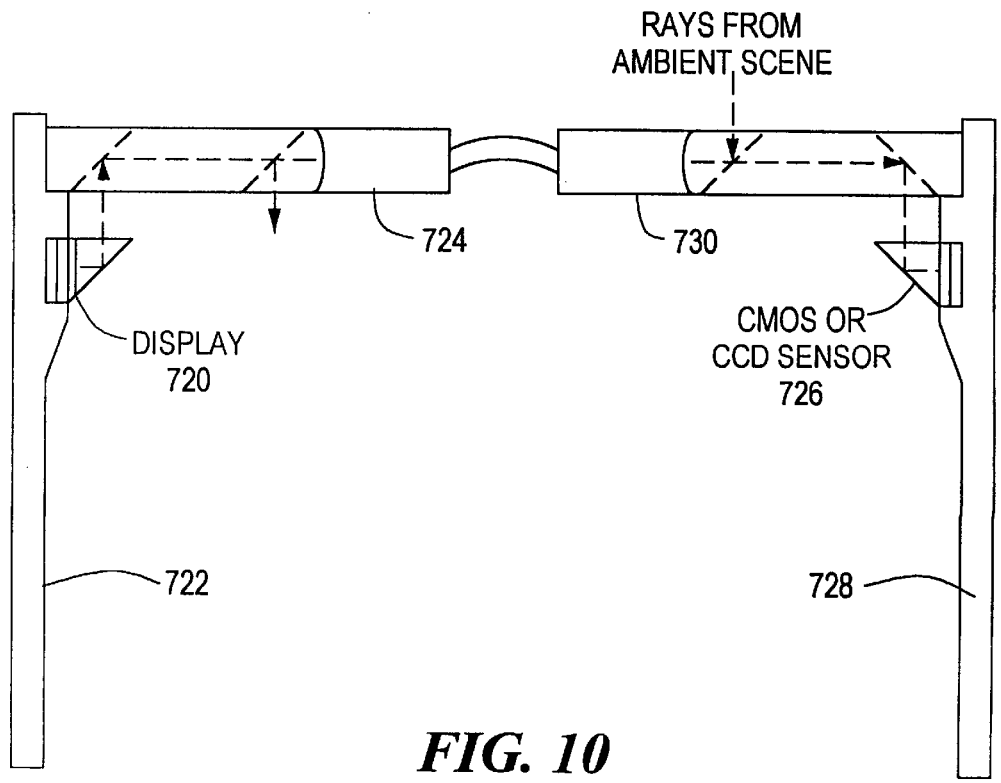
FIG. 10 is a top plan view of an eyeglass interface system incorporating a camera and a display.

As noted above, the subsystems may be integrated with displays. FIG. 10 illustrates an embodiment in which a display 720 is integrated within the left temple 722 and left lens 724, and a camera 726 is integrated in the right temple 728 and lens 730. It is also possible to feed the data directly front the camera to the display. For example, a number of commercial cameras, as well as CMOS and CCD image sensor integrated circuits, provide signals conforming to the National Television Systems Consortium (NTSC) specification. This analog data can be supplied to most liquid crystal display drive electronics directly, without the use of a computer. One such display is the CyberDisplay offered by Kopin Corporation. In this way the display can serve as a viewfinder or monitor for the camera.

Many important devices can be constructed with this sample arrangement. If the camera sensor comprises a long wavelength infrared focal plane array or other sensor, then the device allows the user to have vision in the long wavelength range which is well suited for vision through smoke. Firefighters use long wavelength sensors to find people in smoke-filled buildings in which the performance of ordinary vision is poor. Additionally, systems of this type can be configured for enhanced night vision by using infrared image sensors, or by using highly sensitive low-light image sensors. The system can also serve in surveillance applications in which imagery from one set of eyeglasses is transmitted to a second set. This allows a surveillance team to share images.

The eyeglass embodiment of the various camera systems comprises an improvement over the prior art alternatives owing to its light weight and compact nature, as well as owing to the automatic aiming of the camera by virtue of its mounting within eyewear, and its use of the eyeglass lens to align the camera to the user's pupil. Additionally, such systems can be used without employing the hands, making it possible to conduct other tasks while using the device.

The present invention also utilizes audio transducers integrated within eyeglasses as communication devices and as input/output devices for computers. In addition to the integration of audio with an eyeglass display and/or camera system, another embodiment contemplates the use of bone conductivity transducers to allow the transducers to be concealed within the eyeglass frames. Bone conductivity transducers are designed to transmit sound vibrations directly to solid media (bone) and not to develop a pressure wave in air. Accordingly, bone conductivity transducers are not generally audible unless in contact with the head. Additionally, bone conductivity transducers are not worn in the ear canal and accordingly do not block normal hearing and further do not require an audio microphone near the mouth. For this reason, bone conductivity transducers permit the concealment of the transducers within eyewear.

As shown in FIG. 11, a bone conductivity transducer 810 serving as the speaker may be mounted to the temple 800 of an eyeglass frame so as to be in contact with the skull at a point approximately centered over the ear. The transducer may be mounted on a sliding mechanism in the manner of the camera sensor described earlier. The transducer is mounted on the inside of the temple for adequate contact to the head. The temples are provided with adequate tension so as to press the transducer comfortably to the skin. The sliding mechanism allows the user to adjust the position for best fit. The transducer is in communication with the rest of the system through leads 820 which may extend through a cavity 830 within the temples (FIG. 12). The leads may be made from flexible stranded insulated wire, flexible coaxial cable, or flexible circuitry based on Kapton or other polymeric material. By using flexible material, the position of the transducer may be adjusted without strain to the leads.

One or more bone conduction microphones may be mounted within the eyeglass frame, including within the nose piece, to sense the vibration produced by the user's speech. Alternative positions for bone conduction microphones are along the temple or at the back of a temple behind the ear. In some cases the microphone may be mounted in an attached earpiece which may be inserted into the ear.

Alternatively a directional air conduction audio microphone may be used by placing it at the bottom of the eyeglass frame oriented so as to preferentially detect the sound of the user's speech. A plurality of microphones may be used in order to make possible the implementation of noise reduction techniques using analog or digital signal processing. For certain applications, it is desirable to sense ambient sound instead of or in addition to the user's speech. In that case, an air conduction microphone similar to ones used in hearing aids may be used in any convenient place along the eyeglass frame. For the particular application of assisting the hearing impaired, the microphone would be so oriented so that sound coming from the area in front of the user is preferentially detected, in alignment with the camera direction if one is used. Alternatively, an external microphone may be used for this application.

In order to accommodate the integrated circuits and flexible interconnect circuitry within the eyeglass temple, the eyeglass temple may be made hollow so as to house the circuits. Additionally, if the temple is made from metal or is metal coated, the circuits can be shielded so that the radio frequency interference from the internal circuits is minimized. Although flexible Kapton circuitry may be used as a substrate and interconnect for the internal electronics, alternatively it is possible to design a multichip module (MCM) and package using the eyeglass temple as a housing, as illustrated in FIG. 13. The metal temple 800 is provided with a cavity 846 having a mounting edge 845 designed to fit with a second part 801 which has an edge 847 that mounts against edge 845. Tho two parts 800 and 801 mounted together form a closed cavity. Part 801 forms the substrate for an MCM and is coated with multi-layer ceramic and conductive patterned layers 848 as is known in the art which provide the interconnection paths to the integrated circuits 849 that are mounted in die form upon the layer 848. FIG. 14 shows a cross section taken along line 840 which shows the enclosure formed when temple 800 is joined to the MCM substrate 801. The MCM may be connected electrically to the other subsystems by wires or flexible interconnect which are not shown in the figures.

FIG. 15 shows an alternative arrangement in which the MCM and its component layers 848 and integrated circuits 849 may be formed within the temple 800. Substrate 801 may contain additional circuits and/or may serve as a cover.

Figure 16:
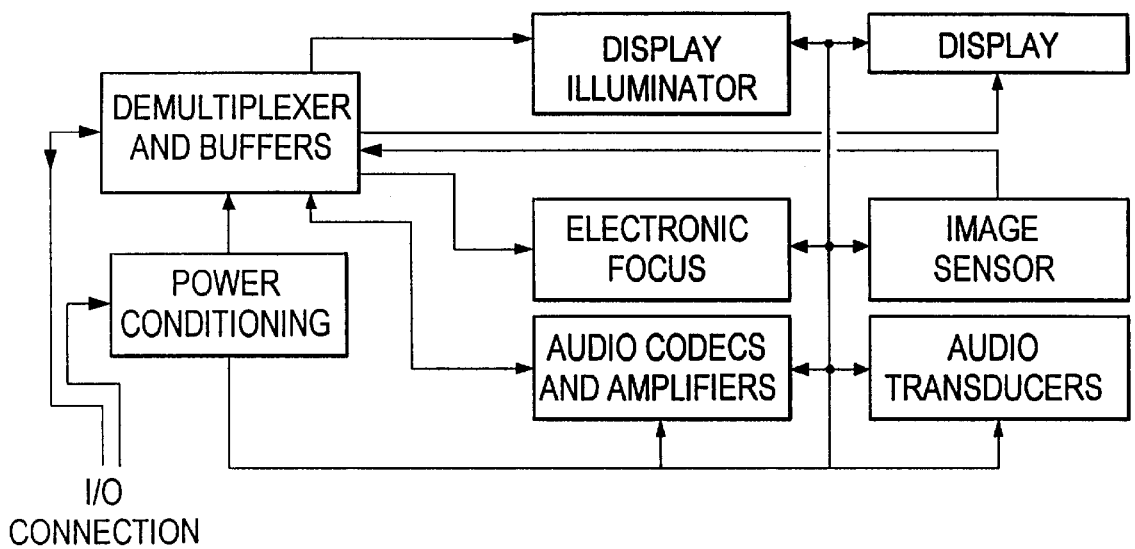
FIG. 16 is a block diagram illustrating subsystems that may be mounted within the eyeglass interface system and circuitry for connection to an external device.

The interconnection of the subsystems to external electronics may be made by individual wires; however an improved method comprises multiplexing and demultiplexing of the signals in digital or mixed signal form. FIG. 16 illustrates a block diagram of the subsystems that may be mounted within the eyeglass system and a multiplexing/demultiplexing circuit intended to simplify connection to the external electronic device. The multiplexer/demultiplexer and buffer circuitry interprets data originating at an external device and which is provided by an input/output (I/O) connection. The circuit identifies the data and stores it in a buffer. The data are then provided to the appropriate subsystem within the eyeglasses. The multiplexer component also collects audio data from the microphone and imagery from the camera and multiplexes it for return along the I/O path to the external device. Such circuits may be formed in integrated fashion and may be mounted within the temples as previously described. In such a case, this multiplexer integrated circuit can be mounted on Kapton flexible circuitry which can connect to the other circuits in the eyeglasses, or it may be part of an MCM. Additionally, a second integrated circuit can be employed to accept power from the I/O connection and condition it so as to provide the supply voltage needled by the various subsystems. The various circuits may be distributed between the left and right temples. There are numerous interconnection and data formatting methods consistent with this approach, including the IEEE 1394 family of standards and the like.

Figure 17A:
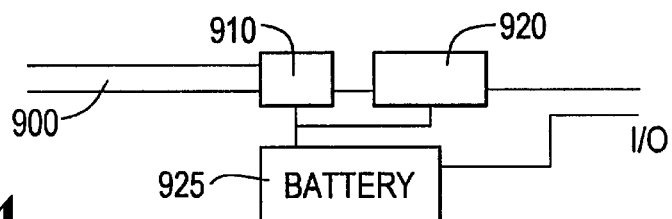
FIGS. 17A–C are block diagrams illustrating connections to external devices.
Figure 17B:
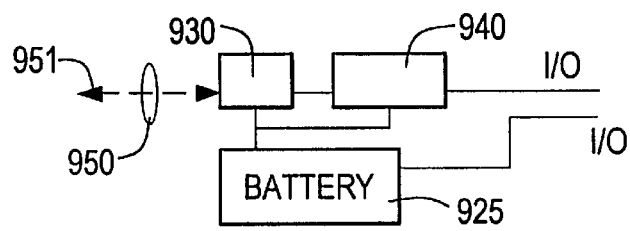
Figure 17C:
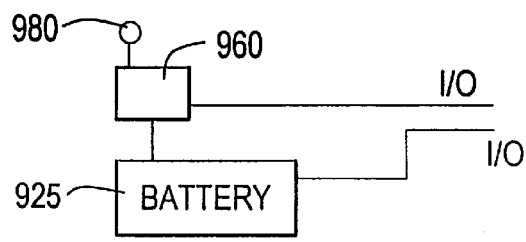

The subsystems described above are connected to remote electronics either by wire as noted above, or by infrared link, radio frequency methods, or by fiber optical cable. FIGS. 17A–C illustrate the three methods. In FIG. 17A, a fiber optical cable 900 provides signals to an integrated laser and detector 910 mounted within the temple of the glasses. The electrical signals are passed to and from a driver and amplifier circuit 920 which is in communication with the I/O line to the demultiplexer in FIG. 16. A second arrangement, shown in FIG. 17B, comprises reception and transmission of data by infrared (IR) link. Infrared radiation illustrated by ray 952 is received and transmitted through lens 950 which directs the light to and from an integrated detector and IR LED pair 930. The integrated detector and LED pair are amplified and driven respectively by circuit 940 which is in communication with the I/O data stream. A further alternative arrangement, shown in FIG. 17C, comprises an RF link in which signals are transmitted and received by antenna 980. These signals are passed to and from transceiver circuit 960, which is in communication with the I/O data stream.

In each of the above embodiments, a battery 925 may also be installed in the eyeglasses which powers the interface circuits and all other devices in the eyewear. The battery may be located within the temple behind the ear or remote from the eyeglass frame and in communication with the eyeglasses by wire.

Figure 18:
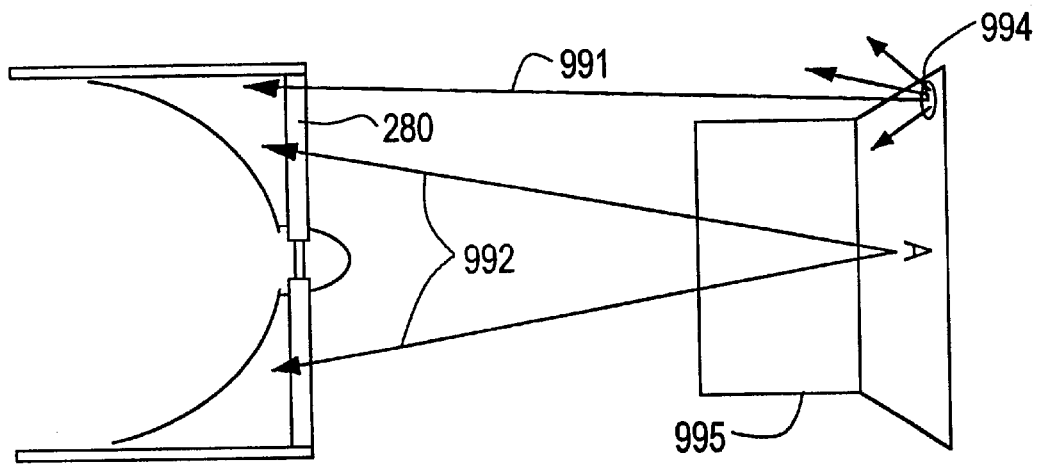
FIG. 18 is a top plan view of an eyeglass interface system incorporating an infrared connection to an external device.
Figure 19:
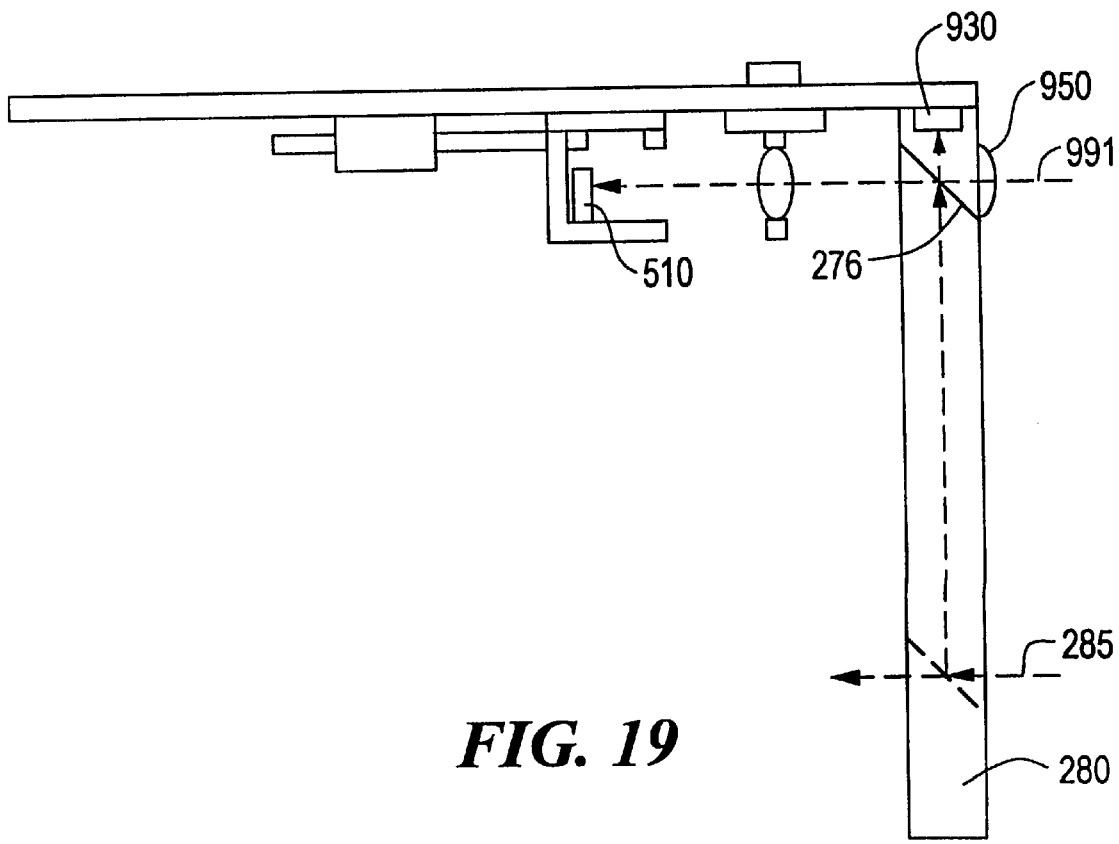
FIG. 19 is a partial top plan view of the eyeglass interface of FIG. 18.

The use of an IR system is illustrated in FIG. 18. A notebook computer or other device 995 is viewed by a user along lines of sight 992 or other similar lines of sight to the device, resulting in a general orientation of the head toward the screen or keyboard of device 995. An LED and detector pair 994 which sends and receives IR signals is positioned or the device 995 so as to be near or within the field of view of the device 995, as shown in FIG. 18. Ray 991 is incident upon a light receiving area of the eyeglasses, defined for example by lens 950 in FIG. 19. The light 991 collected by lens 950 enters the main lens 280 and reflects from the back side of mirror 276 toward IR LED and detector pair 930. Other optical configurations are possible, including locating the pair 930 in the other main lens, and/or configured without the need for mirror 276 or lens 950. Additionally, if the camera is provided with an IR sensor, the detection of the signal may be made directly at the camera sensor 510.

Figure 20:
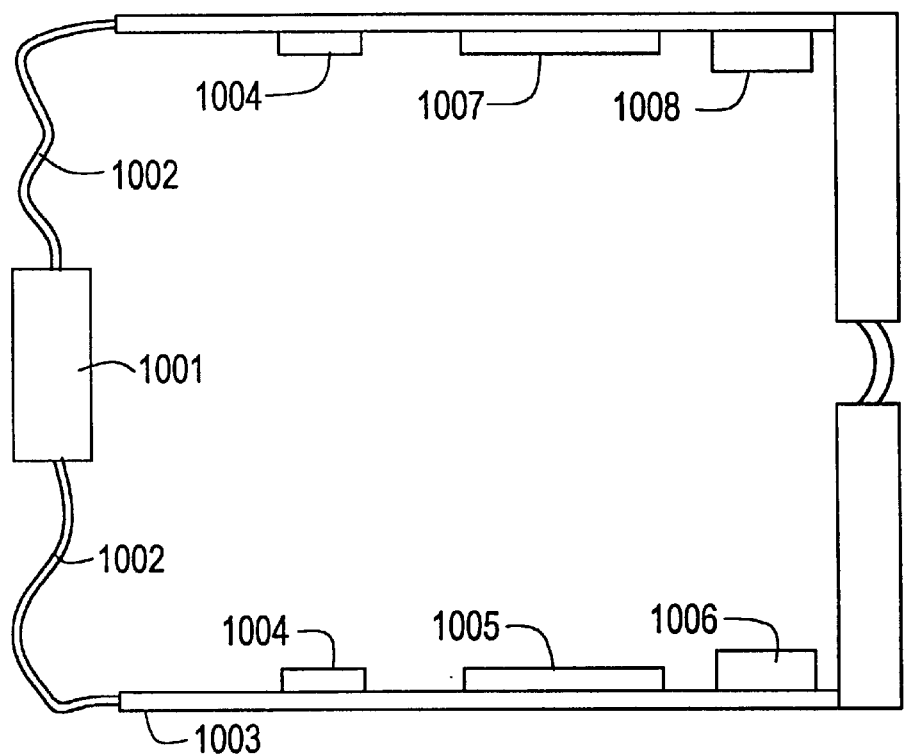
FIG. 20 is a top plan view of an eyeglass interface system with plug-in module.

The integration of microphones, speakers, camera and display within or upon the eyeglass frames makes possible a wide range of communication and recording devices, in addition to computer input and output devices. A multimedia interface module, comprising one, several, or all of the audio and video subsystems, has numerous applications when combined with the appropriate circuitry. FIG. 20 illustrates a system with a plug-in module 1001 located on a strap 1002 behind the head. The strap may contain within it batteries, electronic circuits, and wires and may also be fitted to hold the glasses in position in the conventional manner. The strap may be flat if it contains Kapton flex circuitry, or it may have a rectangular or other cross section. The glasses may be fitted with audio transducers 1004, electronics 1005 to drive a flat panel display 1006, a camera sensor 1008 and related electronic and mechanical parts 1007 as previously described herein. Alternatively, the internal circuitry of the plug-in module 1001 may be permanently mounted within the eyeglass frame 1003. If the circuitry is too large for integration in the eyeglass frame, and is also too large for head mounting, the strap 1002 may be lengthened so that the plug-in module 1001 can be placed in a pocket or worn on a belt.

An application of a display system using audio within the glasses is in a hands-free telephone interface. In such an application, the eyeglass system is connected to telephone circuitry, such as a cellular or cordless telephone, provided in the module 1001. A keypad is unnecessary if voice recognition is employed. In such a case, the user speaks the command normally input by keypad, such as the number to dial, the send command, and so forth. The display within the interface module shows the number to be called for verification, just as the display on a cell phone would show the number, and after the appropriate send command is spoken, the call is placed. The user speaks and listens through the audio capability of the eyeglass system. This is an improvement over the standard cell phone interface because the user's hands are free, and the user does not have to look away from his current field of view in order to verify the number to be called.

An electronic hands-free pager may be incorporated within the eyewear interface system by interconnecting the system to a pager receiver by wire within strap 1002 to module 1001. Alternatively, the pager receiver or transceiver circuit may be incorporated within the eyeglass frame itself.

The interface system may be provided with a timepiece module within the eyeglass frame so that the time is displayed in the user's field of view by the display. In addition to providing the time in a hands-free manner, a further improvement over wristwatches and wall clocks is that the user may check the time in a non-obvious way thereby avoiding giving offense to others with which the user is conversing.

The interface system may be connected to an information sending unit or may be fitted with an RF receiver for reception of critical information, located within module 1001. This information system may be, but is not limited to, a general function computer such as a notebook computer. For example, a receiver may be mounted in the eyeglass frame to display simple alpha-numeric characters. A transmitter in communication with this receiver may be provided with a blood pressure or other vital sign monitoring device, so that a surgeon may be provided with vital sign data for a patient. In this way the data is available to the surgeon in a hands-free manner and without the need for the surgeon to look away from the incision.

Many other similar information systems are possible For example, an electronics engineer may be provided with a display is of the output of an oscilloscope or network analyzer. In this way, the engineer can see the output of the measurement device without the need to look away from the device under test.

The camera and microphone within the glasses allow the system to perform many of the functions of a camcorder or still camera. Audio and video may be recorded in electronic memory and then may be transmitted to tape or disk storage media. The advantages over current camcorders are that the interface system, including the camera, is largely hands-free. The only requirement is that the user activate the recorder either by spoken command or by the use of buttons on the recording device. A head tracking position sensor can be used to stabilize the image. In such a device, the recording device (for example, tape recorder, recordable digital video disk system, recordable compact disk system) are located in module 1001.

The camera system comprises standard CCD or CMOS image sensors that are commercially available from Texas Instruments, Kodak, and other sources. These sensors are used in camcorders and electronic cameras. The image sensors are combined with the eyeglass optics so that the camera has a view of the world as seen by the user's eye. The camera may be mounted in the same optical system as the display, or as shown in FIG. 1, the camera system optics may be mounted for use in the right eye, and the display system optics for use in the left eye.

The head tracking module is useful for augmented reality applications in which information displayed by the interface system is superimposed on the user's field of view by the optical system. For example, computers are used to calculate position from global positioning satellites to provide navigation information to a user. If the system also has information on the direction of gaze of the user, by virtue of a head-tracker sensor, symbols may be provided that are registered to the field of view, such as street names. When the user looks toward a side street, the computer may calculate the position of the intersection of the streets and present the name of the crossing street to the user. Many other applications of augmented reality are possible.

The tracking sensors may comprise either magnetic and gravity sensors that determine position from the earth's magnetic and gravitational fields, or from other artificial magnetic fields. Sensors may be mounted in module 1001 if it is held against the head or alternatively within the eyeglass frame. The magnetic sensor may be based on the Hall effect or may use flux gate magnetometers. Any sensor that detects magnetic field strength and direction may be used in this application, provided the sensor is small enough to fit within an eyeglass frame or module. An alternative is to position magnetic sensors within module 1001 which is worn upon the shoulders of the user, and to place small magnets within the glasses frame. In this way the magnetic sensors can determine the user's head position. Many other types of sensors may be used for the head tracking system, including miniature gyroscopic or other inertial sensors, ultrasonic sensors and even systems that use images from the camera system to detect head movement.

The eyeglass module can be used for video conferencing. In this application, the interface system comprises a display, camera, associated optics, and audio system in communication, either by wire or local RF, with a transceiver which is itself in communication with the video conferencing partner. Video conferencing systems with standard CRT video and microphone/speaker audio are known in the art. In the present invention, the user receives information in audio and video form through the system interface (display and audio subsystems) and transmits information from the system interface, this information being collected from the microphone and camera. In a video conference, the user transmits to the conference images he sees. Alternatively, the user may face a mirror to transmit his own image. The improvement over the prior art is the high degree of portability offered by this invention.

Many surveillance systems are possible using the interface system, including systems in which the surveillance is concealed by the eyeglass frame. The system may be used by law enforcement personnel to transmit audio and video between agents, in a manner similar to the video conferencing application. For example, an agent on the street may see an image collected by an agent on a roof top. Another application involves patient monitoring in hospital intensive care units. A third surveillance application comprises a baby monitor. The glasses may receive images and audio from a camera located in a nursery so that the parent may see and hear the baby from anywhere in the house.

Figure 21:
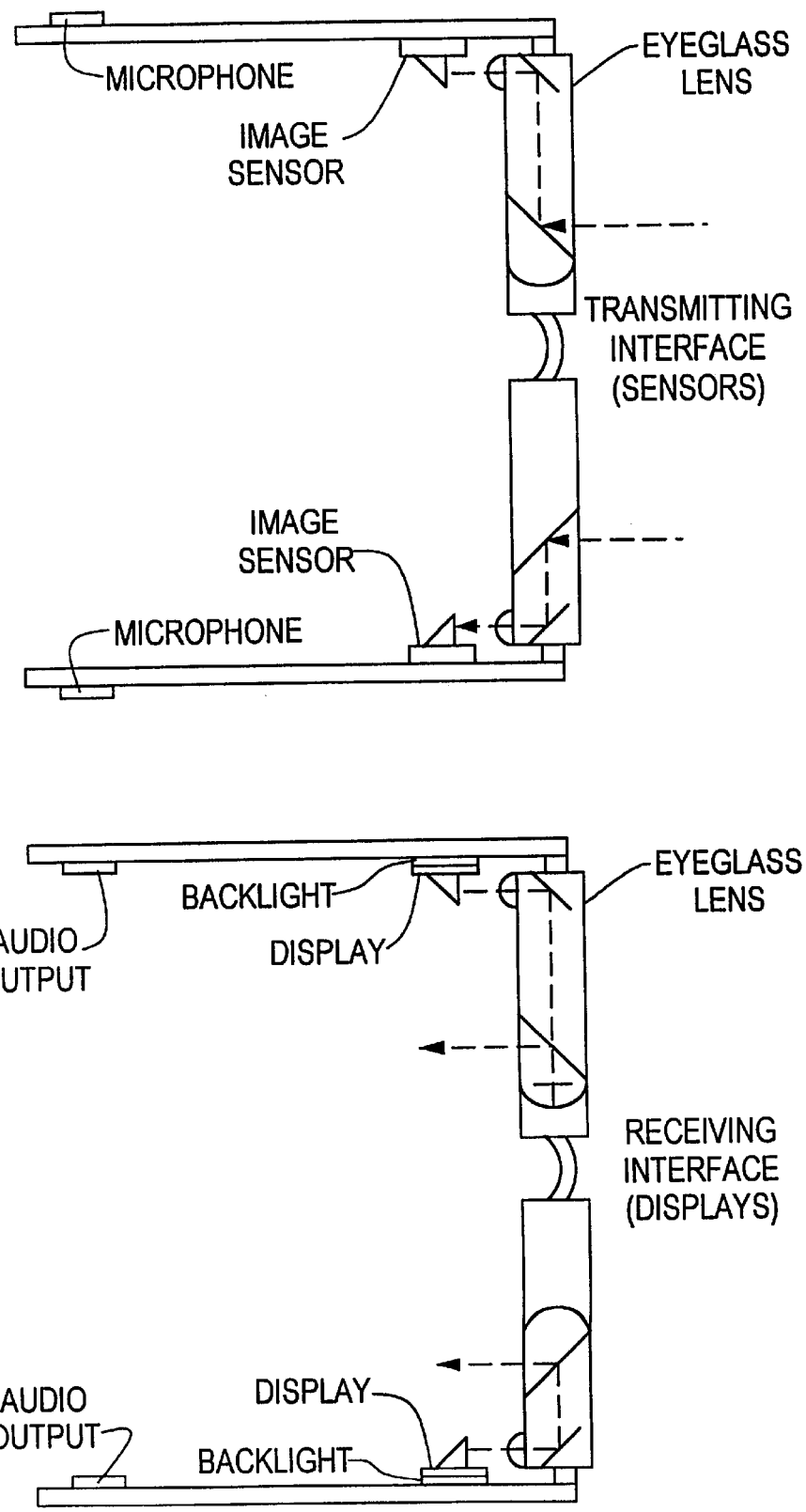
FIG. 21 is a top plan view of a telepresence system according to the present invention.

The interface system may be applied in telepresence systems, in which the user receives visual and audio information from a remote source, as if he were present at the remote source. A transmitter at the remote source collects information from the environment and sends it to the receiver. As shown in FIG. 21, the remote system is configured with two cameras, one in each eye as shown, and two microphones near the left and right ears. The receiving system comprises an interface module fitted with two displays and two audio transducers so that the resulting receiving system displays information as it is collected from the transmitting sensor. In this manner, the user has the sensation of presence at the remote location.

The invention is not to be limited by what has been particularly shown and described, except as indicated by the appended claims.

What is claimed is:

1. An eyeglass interface system comprising:
   an eyeglass frame having first and second lens holders and first and second temples configured to be supported on a user's head;
   a first lens disposed within the first lens holder and a second lens disposed within the second lens holder; and
   a display assembly comprising:
      an image source supported by the first temple,
      an optical pathway disposed internally within the first lens to receive light from the image source, and
      an insert in the first lens to redirect light on the optical pathway to the user's eye;
   an audio or video assembly mounted to the second temple and in communication with the display assembly, the audio or video assembly operative to receive or transmit audio or video signals; and
   interface circuitry in communication with the display assembly and the audio or video assembly.

2. The eyeglass interface system of claim 1, wherein the audio or video assembly includes a camera assembly.

3. The eyeglass interface system of claim 1, wherein the audio or video assembly includes a microphone.

4. The eyeglass interface system of claim 1, wherein the audio or video assembly includes a speaker.

5. The eyeglass interface system of claim 1, wherein the audio or video assembly includes a telephone assembly.

6. The eyeglass interface system of claim 1, wherein the audio or video assembly includes a pager assembly.

7. The eyeglass interface system of claim 1, wherein the audio or video assembly includes an audio recorder.

8. The eyeglass interface system of claim 1, wherein the audio or video assembly includes a clock assembly.

9. The eyeglass interface system of claim 1, wherein the audio or video assembly includes a head tracking assembly.

10. The eyeglass interface system of claim 1, wherein the interface circuitry is in communication with a general function computer.

11. The eyeglass interface system of claim 1, wherein the audio or video assembly includes a video conferencing assembly.

12. The eyeglass interface system of claim 1, wherein at least one of the first and second temples is hollow and the interface circuitry is disposed within the at least one of the first or second temples.

13. The eyeglass interface system of claim 1, wherein at least one of the first and second temples is hollow and the interface circuitry comprises a multi-chip module disposed within the at least one of the first and second temples.

14. The eyeglass interface of claim 1, further comprising an interface module and the interface circuitry is disposed within the interface module.

15. The eyeglass interface of claim 14, wherein the interface module is mounted on a strap attached to the first and second temples.

16. The eyeglass interface system of claim 1, wherein the interface circuitry comprises multiplexer/demultiplexer circuitry.

17. The eyeglass interface system of claim 1, wherein the interface circuitry further comprises a connection to remote electronics.

18. The eyeglass interface system of claim 17, wherein the connection to remote electronics comprises an electrical wire, an infrared link, a radio frequency link, or a fiber optical cable.

19. The eyeglass interface system of claim 1, further comprising a battery mounted on the at least one of the first or second temples in communication with the interface circuitry.

20. The eyeglass interface system of claim 1, wherein the audio or video assembly includes an infrared detector.

21. An eyeglass interface system comprising:
an eyeglass frame having first and second lens holders and first and second temples configured to be supported on a user's head;
a first lens disposed within the first lens holder and a second lens disposed within the second lens holder; and
a camera assembly mounted to the first temple, the camera assembly having a lens directed to view the field of view through the first lens.

22. The eyeglass interface system of claim 21, further comprising an image source assembly comprising:
an image source supported by the second temple;
an optical pathway disposed internally within the second lens to receive light from the image source; and
an insert in the second lens to redirect light on the optical pathway to the user's eye.

23. The eyeglass interface system of claim 22, wherein the camera assembly is in communication with the image source assembly to feed images viewed by the camera assembly to the image source assembly.

24. The eyeglass interface system of claim 21, further comprising a processor in communication with the camera assembly, the processor operative to receive video images from the camera assembly and recognize the video images as commands.

25. The eyeglass interface system of claim 24, wherein the processor is operative to recognize written characters, optical codes, bar codes, faces, or hand signals.

26. The eyeglass interface system of claim 21, further comprising a character recognition system in communication with the camera assembly.

27. The eyeglass interface system of claim 21, further comprising a video image processor in communication with the camera assembly.

28. The eyeglass interface system of claim 21, further comprising a bar code recognition system in communication with the camera assembly.

29. The eyeglass interface system of claim 21, further comprising a face recognition system in communication with the camera assembly.

30. The eyeglass interface system of claim 21, further comprising a hand signal recognition system in communication with the camera assembly.

31. The eyeglass interface system of claim 21, further comprising an audio transducer mounted to one of the first and second temples.

32. The eyeglass interface system of claim 31, wherein the audio transducer comprises a speaker or a microphone.

33. The eyeglass interface system of claim 32, wherein the audio transducer comprises a bone conductivity transducer mounted to be in contact with the user's head.

34. The eyeglass interface system of claim 32, wherein the audio transducer is slidingly mounted to one of the first and second temples.

35. The eyeglass interface system of claim 21, wherein the camera assembly is angularly adjustably mounted to the first temple to adjust the angle of view.

36. The eyeglass interface system of claim 21, wherein the camera assembly further includes a movable optical element mounted to the first temple to adjust the angle of view of the camera assembly.

37. The eyeglass interface system of claim 21, wherein the camera assembly is linearly movably mounted to the first temple to adjust the focus of the camera assembly.

38. The eyeglass interface system of claim 37, wherein the camera assembly further includes a base slidably mounted to the temple and a handle extending through a slot in the temple.

39. The eyeglass interface system of claim 38, wherein the base is slidably mounted to the temple within one or more tracks.

40. The eyeglass interface system of claim 21, wherein the camera assembly further includes a focusing lens slidably mounted to the first temple.

41. The eyeglass interface system of claim 21, wherein the camera assembly further includes a lens mounted to the first lens to change a focal length of the camera assembly.

42. The eyeglass interface system of claim 21, wherein the camera assembly further includes a lens mounted to the first lens to change the optical power of the camera assembly.

43. The eyeglass interface system of claim 21, further comprising a shroud disposed to conceal the camera assembly.

44. The eyeglass interface system of claim 21, further comprising a cable connected to the camera assembly for communication with camera circuitry.

45. The eyeglass interface system of claim 21, further comprising camera circuitry disposed within the first temple and in communication with the camera assembly.

46. The eyeglass interface system of claim 21, wherein the camera assembly is mounted on a side of the temple adjacent to the user's head.

47. The eyeglass interface system of claim 21, further comprising a second camera assembly mounted to the second temple, the second camera assembly having a lens directed to view the field of view through the second lens.

48. The eyeglass interface system of claim 21, further comprising an optical element disposed internally within the first lens to direct light to the camera assembly.

49. The eyeglass interface system of claim 21, further comprising a beam splitter coating and reflective surface embedded within the first lens, the beam splitter coating disposed to direct ambient light on a first optical path through the lens to the user's eye and on a second optical path internally within the first lens to the reflective surface, the reflective surface disposed to direct light on the second optical path to the camera assembly.

50. The eyeglass interface system of claim 49, wherein the beam splitter coating comprises a polarized beam splitter coating, and further comprising a quarter wave plate and a further reflective surface disposed on a further portion of the second optical path to receive and rotate light from the polarized beam splitter coating and reflect the light to the reflective surface.

51. The eyeglass interface system of claim 21, wherein the camera assembly further includes a video camera.

52. The eyeglass interface system of claim 21, wherein the camera assembly further includes a charge coupled device or a complementary metal oxide semiconductor image sensor.

53. The eyeglass interface system of claim 21, wherein the camera assembly further includes an auto focus mechanism.

54. The eyeglass interface system of claim 21, wherein the camera assembly further includes image stabilization.

55. An eyeglass interface system comprising:

an eyeglass frame having a lens holder assembly configured to hold a pair of lenses and first and second temples configured to be supported on a user's head;

a cavity formed within the first temple;

an audio or video assembly mounted to one of the first and second temples, the audio or video assembly operative to receive or transmit audio or video signals;

interface circuitry in communication with the audio or video assembly, the interface circuitry comprising a multi-chip module disposed within the cavity.

56. The eyeglass interface system of claim 55, wherein the multi-chip module includes a substrate comprising conductive patterned layers.

57. The eyeglass interface system of claim 56, wherein the substrate is formed on a cover member configured to close the cavity in the first temple.

* * * * *

UNITED STATES PATENT AND TRADEMARK OFFICE
CERTIFICATE OF CORRECTION

PATENT NO.    : 6,091,546
DATED         : July 18, 2000
INVENTOR(S)   : Mark B. Spitzer et al.

It is certified that error appears in the above-identified patent and that said Letters Patent is hereby corrected as shown below:

Column 15,
After line 13, please insert the following paragraph -- a pair of lenses disposed in the lens holder assembly; --.

Signed and Sealed this

Tenth Day of May, 2005

JON W. DUDAS
*Director of the United States Patent and Trademark Office*